Patented Feb. 7, 1928.

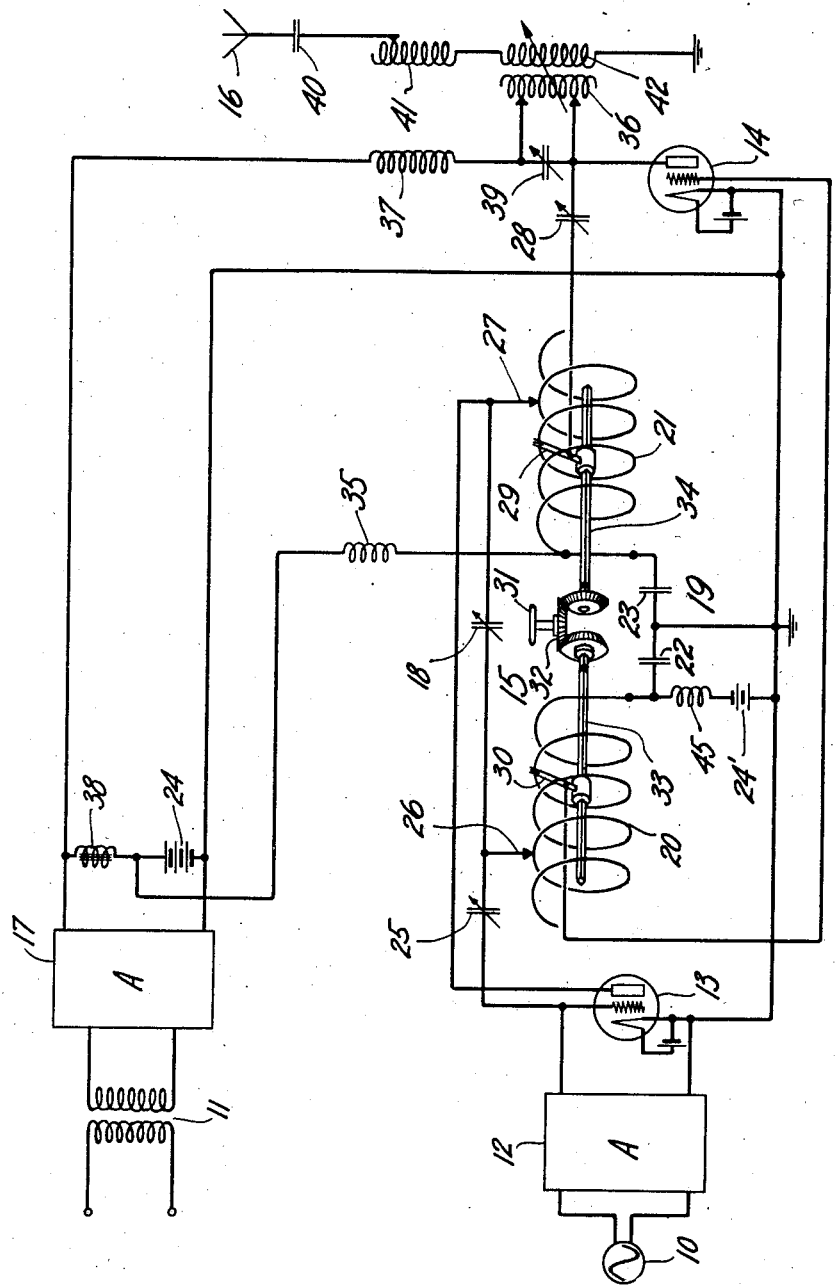

1,658,210

UNITED STATES PATENT OFFICE.

FRANCIS M. RYAN, OF EAST ORANGE, NEW JERSEY, ASSIGNOR TO BELL TELEPHONE LABORATORIES, INCORPORATED, OF NEW YORK, N. Y., A CORPORATION OF NEW YORK.

ELECTRIC-WAVE SIGNALING SYSTEM.

Application filed December 29, 1925. Serial No. 78,125.

This invention relates to electric wave signaling systems and more particularly to balanced coupling means for space discharge repeaters.

When space discharge tubes are arranged in tandem for successively repeating or amplifying high frequency waves, certain difficulties are encountered, as a result of the tendency for parasitic oscillations to be established through the coupling afforded between input and output circuits of the tubes by their interelectrode capacity.

This tendency is especially marked in circuits including resonant paths such, for example, as resonant coupling circuits. Because advantages are to be gained by the use of resonant coupling circuits, principally that of high selectivity, it is desirable to provide means to prevent parasitic oscillations even when such coupling circuits are employed.

The expedient of providing an external capacity for balancing the internal tube capacity of a repeater or amplifier is well known and has been widely adopted in radio receiving circuits.

The arrangement by means of which a balance is secured usually includes a resonant circuit for selecting the waves to be repeated or otherwise translated. This circuit is ordinarily included either in an input or in an output circuit of the space discharge tube, the capacity of which is to be balanced, and in many instances the resonant circuit is included both in an input circuit of one tube and an output circuit of a preceding tube.

Such coupling and balancing arrangement have not been generally applied to radio transmitting circuits, because of practical difficulties of tuning and economic considerations relative to the size and cost of condensers requisite to permit an adjustment of the transmitters for operation over the desired range of wave lengths.

The present invention, however, provides a balanced coupling circuit for repeaters applicable to either transmitting or receiving circuits, but which is especially adapted for use in radio transmitting circuits.

An object of the present invention is to couple space discharge repeaters.

Another object is to highly selectively transmit electric waves.

A further object is to prevent parasitic oscillations in space discharge tubes.

A still further object is to transmit electric waves over a balanced circuit including a path highly selective of waves of a particular frequency and to adjust the selectivity of the path independent of change in the balance of the circuit.

A feature of the invention is a coupling circuit for space discharge repeaters which includes a single resonant circuit and which is adapted to compensate for inherent interelectrode capacity of a plurality of repeater tubes in tandem for the prevention of parasitic oscillations.

Another feature relates to coupling repeaters by means of a balanced tuned coupling circuit having a double adjustable reactance, whereby the power output of certain of the repeaters may be varied without affecting the balance of the coupling circuit.

Considered broadly the invention comprises a source of electric waves, a plurality of space discharge repeaters connected in tandem between this source and a load circuit, and a resonant coupling circuit included between the repeaters. The coupling circuit may be adapted to be tuned to select waves of different frequencies and in addition is preferably provided with supplementary means, which will usually include condensers, for balancing the interelectrode capacities of the repeaters.

The resonant coupling circuit also includes a reactive element or elements, for example, an inductance coil or coils, which may be so adjusted as to vary the power output of one of the coupled repeaters without disturbing the balanced condition of the circuit and hence without introducing any condition favorable to the production of parasitic or inherent oscillations in the repeater circuits.

In the specific embodiment which has been chosen to illustrate the invention the reactance element is an inductance coil consisting of a bare conductor and means for causing movement of separate conductive wipers simultaneously and in synchronism along the winding of the coil in opposite directions.

The inductance coil is arranged to function as an element of the balancing circuit for a plurality of tubes and, as illustrated, to cooperate in balancing the output circuit of one repeater and the input circuit of another repeater.

Further features and objects of the invention will appear as the following detailed description is read in conjunction with the drawing, wherein the one figure illustrates the invention as embodied in a radio transmitting circuit.

The radio transmitter circuit shown in the drawing includes a source 10 of high frequency carrier waves and a transformer 11, the primary winding of which constitutes a source of signal waves. This winding may be connected to a wire line, or a microphone transmitter or other signal transmitting apparatus.

The source 10 is connected through an amplifier represented by block 12 to the amplifiers 13 and 14, which are coupled in tandem by means of a resonant circuit 15. The output circuit of amplifier 14 is coupled to an antenna 16.

The amplifier 12 is not shown in detail, because it may be of any suitable type adapted to amplify high frequency waves and many well known forms are available for this purpose, but it preferably is a space discharge tube amplifier.

The secondary winding of the transformer 11 is connected to input terminals of an amplifier represented by block 17 which may also be any one of many well known forms suitable for amplifying signal frequency waves.

The amplifiers 17 and 14 are preferably arranged, as illustrated, for modulation by the well known constant current methods substantially as disclosed in U. S. Patent 1,442,147 granted to R. A. Heising, January 16, 1923.

The input circuit of the amplifier 13 is connected to the output terminals of amplifier 12 and the output circuit of amplifier 13 includes the resonant circuit 15. This resonant circuit comprises an adjustable condenser 18 arranged in shunt to the inductance coil 19, which comprises the two sections or elements 20 and 21. There are also included in the resonant circuit between the adjacent end turns of coil elements 20 and 21 two blocking condensers 22 and 23, which, however, have such large capacity as to produce no material effect upon the resonant frequency of circuit 15. Therefore these condensers transmit currents having a frequency of the order of the frequency to which circuit 15 is tuned substantially without reactive effect. For this reason sections 20 and 21 constitute, for high frequencies, a single coil.

Condensers 22 and 23, however, serve to block the direct current from batteries 24 and 24'. The former supplies space current to the tubes 13 and 14, and the latter supplies a suitable polarizing potential to the control electrode of tube 14 in series with a choke coil 45. This choke coil is of high impedance to high frequency waves and prevents unbalance of the coupling circuit.

The grid of tube 13 is connected in series with an adjustable compensating condenser 25 to a variable tap 26 on coil 20, whereas the plate of tube 13 is connected to the variable tap 27 on the coil 21. The anode of tube 14 is connected in series with the adjustable compensating condenser 28 to a variable wiper 29 on coil 21, whereas the grid of this tube is directly connected to a corresponding wiper 30 on the coil 20. The coupling circuit is grounded at a point midway between the condensers 22 and 23.

By means of a knob 31 connected by a differential gear 32 to shafts 33 and 34 the wipers 29 and 30 may be rotated simultaneously in opposite directions and by equal amounts.

The space current circuit of tube 13 may be traced from its anode to tap 27 on coil 21, through a portion of this coil, to high frequency choke coil 35, battery 24, to ground at the cathode of the tube 13.

The space current circuit of tube 14 may be traced from its anode through coil 36, high frequency choke coil 37, low frequency choke coil 38, battery 24 to ground at the cathode of tube 14.

The coil 36 and an adjustable condenser 39 form a resonant circuit. The antenna circuit includes, in series, the antenna 16, condenser 40, loading coil 41 and coupling coil 42. One terminal of the coil 42 is connected to ground. The coils 36 and 42 are variably inductively coupled whereby waves may be transmitted from the tube 14 to the antenna 16.

In the operation of the circuit described above, high frequency waves are supplied by source 10 through amplifier 12 to the amplifier 13. The amplified waves from tube 13 are supplied to the resonant circuit 15 which selectively transmits waves of the desired frequency to the input circuit connected to the control electrode and cathode of the amplifier 14. The circuit 15 will ordinarily be tuned to the frequency of waves from source 10. If any waves of extraneous frequencies are present in the waves supplied by the source 10, or are introduced by the action of amplifiers 12 and 13, they will be excluded by the resonant circuit 15. The selected waves thus appear in the output circuit of tube 14. Signal waves from the source 11 supplied by the amplifier 17 are caused to modulate the amplified high frequency waves present in the output circuit of tube 14, in the manner disclosed in the above mentioned patent to Heising. Signal modulated carrier waves are accordingly transmitted through resonant circuit 36, 39 to the antenna 16.

Choke coils 35 and 37 are provided to exclude high frequency waves from the space current circuits of tubes 13 and 17.

The transmitter which has been described is suitable for use in field surveys wherein it is desired to continuously vary the transmitted power over a wide range as well as for broadcasting where it is often desirable to vary the power level. To effect this change of output power, the voltage of the waves supplied to tube 14 from source 10 is controlled by continuous adjustment of the wiper 29 on coil 20.

The input circuit of tube 14 includes the portion of coil 20 between the wiper 30 and the condenser 22. The portion of coil 21 between the wiper 29 and the condenser 23 is included in a path between the anode and cathode of tube 14 which path also includes the compensating condenser 28. In order that the condenser 28 may properly balance the inherent capacity between the anode and control electrode of tube 14, it is necessary to maintain a unity ratio in the number of turns of coils 20 and 21 included respectively between the control electrode and cathode and the anode and cathode of tube 14. The knob and gear arrangement for driving wipers 29 and 30 enables this unity ratio of turns to be maintained and at the same time permits the power output of tube 14 to be continuously controlled or varied.

The balance of the paths between the control electrode and cathode and the anode and cathode of tube 13 is unaffected by power adjustments because the paths are connected to the coils 20 and 21 independently of the wipers 29 and 30.

By means of the variable taps 26 and 27 the coupling circuit may be tuned in conjunction with the variable condenser 18. The former may conveniently serve for making coarse adjustments and the latter for fine adjustments.

From the foregoing description it is evident that the coil 19 performs several important functions. In cooperation with condenser 18 it forms a resonant circuit for selecting desired waves. In conjunction with condensers 25 and 28 it prevents the production of parasitic oscillations in the circuits of tubes 13 and 14 resulting from the coupling provided by the inherent capacity between their electrodes, it permits the tuning of the resonant circuit to be adjusted and finally it allows the power output of tube 14 to be adjusted without disturbing the balance of the circuits or the production of inherent oscillations.

Although the invention has been described in connection with a particular physical embodiment it may be included in many other embodiments without the exercise of inventive effort. Accordingly it is to be understood that this invention is limited only as indicated by the scope of the appended claims.

What is claimed is:

1. In an electric wave transmission system, a plurality of space discharge repeaters in tandem, a resonant coupling circuit connecting said repeaters, means cooperating with said circuit to compensate the inherent capacity between electrodes of all of said repeaters, and means for varying the coupling between said repeaters without affecting said compensating means.

2. In combination, a plurality of space discharge tubes, means for coupling said tubes in tandem comprising a balanced resonant circuit, said circuit including an inductance having adjusting means for changing the power output of at least one of said tubes, and additional means for simultaneously adjusting said coil to maintain the balance of said circuit.

3. In combination, a plurality of space discharge tubes arranged in tandem, a balanced coupling circuit for said tubes, said circuit including stabilizing means for preventing inherent oscillations, and means for making continuous power adjustments, said last named means including a variable reactance including a plurality of simultaneously movable members, adapted to maintain the circuit in its stable condition during power adjustments.

4. In a system of space discharge tubes, a plurality of tubes in tandem, said tubes each including an anode, cathode and control electrode, a resonant coupling circuit included between two of said tubes, said circuit comprising an inductance in two sections, a wiper for connecting one of said sections to the control electrode of one of said tubes, a second wiper for connecting the anode of the same tube to the other of said sections and means for causing simultaneous and equal movements of said wipers.

5. In combination a plurality of space discharge tubes, each including an anode, a cathode and a control electrode, a resonant element for coupling said tubes, said element including a sectionalized inductance, one section thereof being included in circuit with the control electrode and cathode of one tube, another section thereof being included in circuit with the anode and cathode of the same tube, a movable wiper associated with each section and adapted to simultaneously vary the number of turns of said sections included in the above mentioned circuits to maintain a unity ratio.

6. In a system of space discharge tubes, a plurality of three electrode tubes, a resonant coupling circuit for connecting said tubes in tandem, an inductance adapted to be included wholly therein, portions of said inductance being also included in circuit with electrodes of certain of said tubes, means cooperating with said inductance for compensating the inherent capacity between certain of said electrodes, and means for varying the inductance included in circuit with said electrodes independent of change of tuning of said circuit or of effect upon said compensating means.

7. In combination, a plurality of space discharge tubes each including an anode, cathode and control electrode, a resonant coupling circuit for said tubes including an inductance in sections, separate connections between the anode and control electrode of one tube to one section, separate connections between the anode and control electrode of a second tube and a second section, means included in a grid connection of one tube and an anode connection of another tube to compensate for the inherent capacity between electrodes of both said tubes, and wipers, included in the connections to electrodes of one tube, adapted to be simultaneously adjusted by equal amounts.

In witness whereof, I hereunto subscribe my name this 15th day of December, A. D. 1925.

FRANCIS M. RYAN.